United States Patent
Lefebvre

(10) Patent No.: US 10,126,825 B2
(45) Date of Patent: Nov. 13, 2018

(54) METHOD FOR RECOGNIZING HANDWRITING ON A PHYSICAL SURFACE

(71) Applicant: ORANGE, Chatillon (FR)

(72) Inventor: Gregoire Lefebvre, Crolles (FR)

(73) Assignee: ORANGE, Paris (FR)

(*) Notice: Subject to any disclaimer, the term of this patent is extended or adjusted under 35 U.S.C. 154(b) by 60 days.

(21) Appl. No.: 15/190,484

(22) Filed: Jun. 23, 2016

(65) Prior Publication Data
US 2016/0378195 A1 Dec. 29, 2016

(30) Foreign Application Priority Data
Jun. 26, 2015 (FR) ...................... 15 55958

(51) Int. Cl.
*G06F 3/01* (2006.01)
*G06K 9/00* (2006.01)
(Continued)

(52) U.S. Cl.
CPC ......... *G06F 3/017* (2013.01); *G06K 9/00402* (2013.01); *G06K 9/00416* (2013.01);
(Continued)

(58) Field of Classification Search
None
See application file for complete search history.

(56) References Cited

U.S. PATENT DOCUMENTS 8,467,608 B2 * 6/2013 Nakamura ............ G06K 9/348
382/174
8,958,648 B2 * 2/2015 Pongratz ............. G06K 9/6212
382/199
(Continued)

FOREIGN PATENT DOCUMENTS

CN 1625741 A * 6/2005 ........ G06F 17/30011
EP 1693784 A2 8/2006
WO 9521436 A1 8/1995

OTHER PUBLICATIONS

Schenk, Joachim, and Gerhard Rigoll. "Novel hybrid NN/HMM modelling techniques for on-line handwriting recognition." Proc. 10th Intern. Workshop on Frontiers in Handwriting Recognition, IWFHR 2006, La Baule, France. 2006.*
(Continued)

*Primary Examiner* — Michelle M Entezari
(74) *Attorney, Agent, or Firm* — Haverstock & Owens LLP

(57) ABSTRACT

The invention relates to a method for recognizing handwriting on a physical surface on the basis of three-dimensional signals originating from sensors of a terminal, the method being characterized in that the signals are obtained on the basis of at least 3 different types of sensors, and in that it comprises steps of sampling, according to 3 axes and over a sliding time window, of inertial signals originating from the sensors, fusing the sampled signals into a 9-dimensional vector for each sampling period, converting the fused signals into a sequence of characteristic 9-dimensional vectors, and, when a signal characteristic of an input start has been detected, storing the sequence of characteristic vectors in a list of sequences of characteristic vectors, the preceding steps being repeated until the detection of a signal characteristic of an input end, the method furthermore comprising, on detection of said signal characteristic of an input end, a step of recognizing a word on the basis of the list of sequences of characteristic vectors created over the time window.

8 Claims, 3 Drawing Sheets

Figure 1:
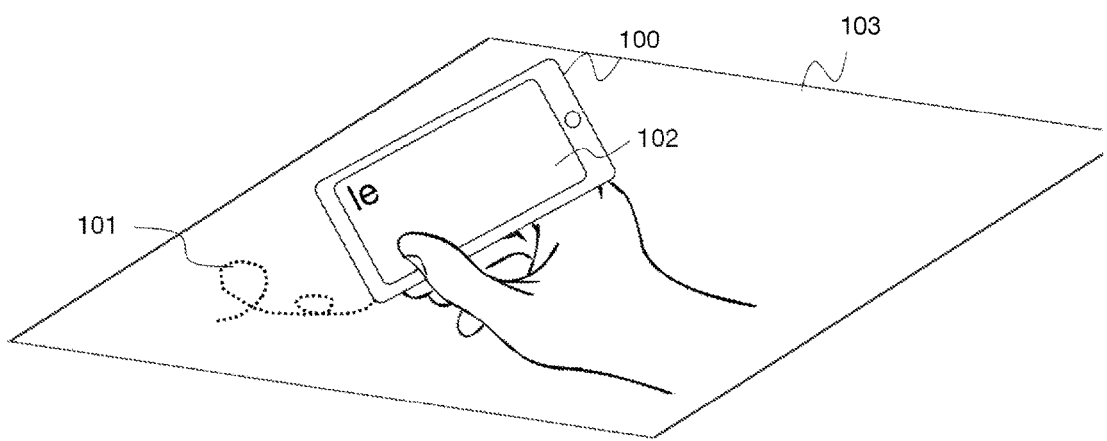

(51) Int. Cl.
*G06K 9/22* (2006.01)
*G06K 9/48* (2006.01)
*G06K 9/62* (2006.01)

(52) U.S. Cl.
CPC ..... *G06K 9/00852* (2013.01); *G06K 9/00872* (2013.01); *G06K 9/00879* (2013.01); *G06K 9/224* (2013.01); *G06K 9/48* (2013.01); *G06K 9/6289* (2013.01); *G06K 2209/01* (2013.01)

(56) References Cited

U.S. PATENT DOCUMENTS

| | | | | |
|---|---|---|---|---|
| 9,251,430 | B2* | 2/2016 | Nakamura | G06K 9/348 |
| 9,383,895 | B1* | 7/2016 | Vinayak | G06F 3/017 |
| 9,740,341 | B1* | 8/2017 | Rosenberg | G06F 3/04883 |
| 2005/0222848 | A1* | 10/2005 | Napper | G06F 17/30244 |
| | | | | 705/1.1 |
| 2011/0020779 | A1* | 1/2011 | Hannaford | G09B 23/28 |
| | | | | 434/262 |
| 2011/0298742 | A1* | 12/2011 | Dingnan | G06F 3/03545 |
| | | | | 345/173 |
| 2012/0308143 | A1* | 12/2012 | Bellegarda | G06K 9/00416 |
| | | | | 382/197 |
| 2013/0103630 | A1* | 4/2013 | Yao | G06N 3/0436 |
| | | | | 706/47 |
| 2013/0311954 | A1* | 11/2013 | Minkkinen | G06F 3/04812 |
| | | | | 715/862 |
| 2015/0049036 | A1* | 2/2015 | Kim | G06F 3/0416 |
| | | | | 345/173 |
| 2015/0116285 | A1* | 4/2015 | Kling | G06F 3/03545 |
| | | | | 345/179 |
| 2015/0149952 | A1* | 5/2015 | Baheti | G06F 17/276 |
| | | | | 715/780 |
| 2016/0321239 | A1* | 11/2016 | Iso-Sipila | G06F 17/2755 |

OTHER PUBLICATIONS

Machine Translation of CN 1625741 A (Year: 2005).*
Lefebvre Gregoire, et al., "BLSTM-RNN Based 3D Gesture Classification", Sep. 10, 2013, Correct System Design, pp. 381-388, XP047040841, ISSN: 0302-9743.
Christoph Amma et al., "Airwriting" Personal and Ubiquitos Computing, Springer Veriaf, London, GB, vol. 18, No. 1, Jan. 1, 2014, pp. 191-203, xp058045738.
Duffner Stefan et al, "3D gesture classification with convolutional neural networks", 2014 IEE International Conference on Acoustics, Speech and signal processing, May 4, 2014, pp. 5432-5436, xp032617733.
Jeen-Shing et al., "An Accelerometer-Based Digital Pen With a Trajectory Recognition Algorithm for Handwritten Digital and Gesture Recognition", IEE Transactions on Industrial Electronics, IEE Service Center, vol. 59, No. 7, Jul. 1, 2012, pp. 2998-3007, XP011417626.
The Search Report for the FR 1555958 application.

* cited by examiner

METHOD FOR RECOGNIZING HANDWRITING ON A PHYSICAL SURFACE

TECHNICAL FIELD

The present invention relates to the field of handwriting recognition.

PRIOR ART

In recent years, we have witnessed explosive growth in "natural" interactions. Interactions of this type are intended to simplify man-machine communication by offering users the facility to interact simply and intuitively with terminals. To do this, one solution consists in allowing a user to interact with a terminal via gestures in 3 dimensions. For example, the user may wish to change a TV channel simply by performing a quick gesture to the right with a remote control, or to activate a random music playback mode on a terminal by performing a shaking gesture (English "shake"). To do this, either the surroundings are fitted with a camera, for example, or the device that is used is fitted, for example, with inertial sensors such as accelerometers, rate gyros or magnetometers.

In order to allow this type of interaction, many terminals and devices are equipped today with sensors of this type. For example, many models of Smartphones, watches or connected wristbands include an accelerometer, or even a rate gyro or magnetometer. Different data analysis systems originating from these sensors have been developed in order to detect the start and end of a gesture in order to then recognize the useful part of the gesture. Gesture recognition may reveal an action such as walking, cycling, running, or a movement such as a rotation, the flipping of the terminal, a shake or a tilt. These techniques can also serve to identify a user by a gestural signature or to trigger an action on detection of a particular movement.

A different form of essential interaction between a user and a terminal relates to text input. Many techniques have been developed in order to improve the efficiency of the input, but, for want of reliable and ergonomic techniques, the use of physical or virtual keyboards or even to a lesser extent handwriting with a pen or a finger on a touchscreen remain the most commonly used techniques.

Among the alternatives to input on a keyboard or by handwriting on a touchscreen, an article can be noted that was published by Wang et al., entitled "An Accelerometer-Based Digital Pen With a Trajectory Recognition Algorithm for Handwritten Digit and Gesture Recognition" (IEEE TRANSACTIONS ON INDUSTRIAL ELECTRONICS, VOL. 59, NO. 7, JULY 2012), which describes an electronic pen using an accelerometer to reconstruct the trajectory in 3 dimensions of the movements of the user in order to recognize digits. Preprocessing techniques are employed (calibration, filtering, etc.) in order to define characteristics of the signal (mean, energy, etc.), then to select said characteristics for learning a specific classifier such as a PNN (for Probabilistic Neural Network in English). Unfortunately, a technique of this type is not satisfactory since the method performs a segmentation of the gestures digit-by digit, which requires a lifting of the pen between each character.

Patent application US20120038652 discloses a method capable of capturing a series of movements performed by a user moving the terminal on a support such as a table. The method uses at least one inertial sensor of the terminal in order to determine, on the basis of the measured accelerations, a path drawn by the user. The document then proposes to use a character recognition algorithm in order to extract the entered text. However, this technique is not suitable for cursive writing and requires the characters to be input one-by-one, which limits the speed of input by a user.

The different existing techniques thus proceed by capturing a drawn path on the basis of information originating from inertial sensors before applying a writing recognition algorithm to extract the text. This two-stage approach introduces approximations in the drawn path and limits the efficiency and ergonomics of the character recognition.

The present invention aims to overcome the aforementioned disadvantages and proposes a simple and tangible method for handwriting without a keyboard or touchscreen.

SUMMARY OF THE INVENTION

For this purpose, the invention relates to a method for recognizing handwriting on a physical surface on the basis of three-dimensional signals originating from sensors of a terminal, the method being such that the signals are obtained on the basis of at least 3 different types of sensors, comprising the following steps:

sampling, according to 3 axes and over a sliding time window, of inertial signals originating from the sensors, fusing the sampled signals into a 9-dimensional vector for each sampling period, converting the fused signals into a sequence of characteristic 9-dimensional vectors, and, when a signal characteristic of an input start has been detected:

adding the sequence of characteristic vectors to a list of sequences of characteristic vectors, the preceding steps being repeated until the detection of a signal characteristic of an input end, the method furthermore comprising, on detection of said signal characteristic of an input end, a step of:

recognizing a word on the basis of the list of sequences of characteristic vectors created between the detection of the input start and end signals.

The data sampled at a suitable frequency on the basis of 3 different sensors allows the movements of the terminal to be determined faithfully in 3 dimensions when a user forms a word by moving a part of the terminal over a flat surface as he would with a pen. The data measured according to 3 axes and originating from the 3 sensors are fused, for example through concatenation, in such a way as to produce a 9-dimensional vector characteristic of a position and an orientation of the terminal for each sampling period. The fused data are converted into a sequence of characteristic vectors reflecting movements of the terminal between the detection of a start signal and an end signal of a drawn path. Unlike the prior art, the step of recognition of a word is not implemented on the basis of a reconstructed image of the drawn path, but directly on the basis of a set of sequences of characteristic vectors obtained iteratively between the input start and input end signals. The recognition of a word drawn using the terminal does not comprise an intermediate step of drawn path image reconstruction, thus limiting the loss of information by avoiding the introduction of inaccuracies and clearly improving the recognition performance compared with the prior art, and, in particular, the recognition of cursive writing.

According to one particular embodiment, the method is such that it furthermore comprises a step of validation of the recognized word by a linguistic model.

Thus, when a word is recognized in the recognition step, said word is validated by a linguistic model. The word may be validated, for example, by a spellchecker, a syntax checker taking account of previously recognized words, or a grammar checker. The method thus allows the recognition quality to be improved. As this step is implemented for recognized words only, the method allows the overall recognition performance to be optimized by avoiding the validation of a manifestly incorrect word. It is understood here that the word deemed to be recognized in the recognition step is a word having a probability of being correct that is greater than a determined threshold. For example, a word may be considered as recognized when the probability that it is correct is greater than 0.9.

According to one particular embodiment, the method is such that the signals characteristic of the input start and end are identified by means of a comparison between a sequence of characteristic vectors and at least one previously recorded sequence of characteristic vectors.

The start and end of a word are detected by comparing characteristic signals originating from the sensors with previously measured signals whose characteristics are stored in a database of the terminal. The method allows temporal segmentation of the words on the basis of the sampled data without the need for the user to indicate the start and end of a word by a particular action. The method thus improves the ergonomics of the input by removing the need for the user to indicate explicitly the start and/or end of a word.

According to one particular embodiment, the method is such that the signal characteristic of an input start is an inertial signal characteristic of a micro-impact on a physical surface.

When the user places the terminal against the physical surface on which it prepares to draw a word, the sensors of the terminal produce a signal corresponding to a micro-impact between the terminal and the support. The detection of this signal allows the start of the input of a word to be determined. Moreover, the detection of this micro-impact allows the position and orientation of the terminal to be determined at the start of the input. These reference data advantageously allow the manner in which the user holds the terminal to be determined. The different corners of the terminal can thus be used to input text, the captured data being interpreted according to the reference position.

According to one particular embodiment, the method is such that the step of recognizing a word is performed by a recurrent bidirectional neural network.

The recognition is performed by a recurrent bidirectional neural network at the input of which the data are presented in the form of a list of sequences of characteristic vectors. For example, the method can use a BLSTM (Bidirectional Long Short-Term Memory) recurrent bidirectional neural network described by Paul J. Werbos in the publication "Backpropagation through time: what it does and how to do it", Proceedings of the IEEE, Volume 78, Issue 10, 1550-1560, October 1990. The use of a recurrent bidirectional neural network allows satisfactory performance to be achieved for handwriting recognition with a complexity compatible with an implementation of the method on a Smartphone mobile terminal.

According to one particular embodiment, the method is such that the neural network is trained in advance on the basis of sequences of characteristic vectors corresponding to words from the vocabulary of the language concerned.

The neural network is trained in advance on the basis of sequences of characteristic vectors corresponding to words from the vocabulary of the language concerned. For example, the training phase includes a teaching of the network during which lists of sequences of characteristic vectors corresponding to words are successively presented at the input of the network while the corresponding words are imposed at the output of the network. The network must then adapt so that the input data correspond to the outputs. The neural network is thus capable of quickly recognizing the words for which it has been previously trained.

According to one particular embodiment, the method is such that the step of converting the signals into a sequence of characteristic vectors includes steps of:
calibrating the signals originating from the sensors,
denoising the calibrated signal by applying a low-pass filter, and
approximating and normalizing the filtered signals.

The calibration of the signals originating from the sensors consists in modifying the values originating from the sensors by sensor measurements taken at rest in a common reference space. In this way, the method compensates for any bias introduced by the sensors or by the manner in which the user holds the terminal. The application of a low-pass filter allows unwanted data to be removed from the signal before its approximation. The approximation of the signal allows the temporal signal to be simplified by line segments. This simplification of the signal allows the complexity of the processing to be reduced and allows the construction of sequences of characteristic vectors that are directly usable for the handwriting recognition and the detection of the input start and end.

According to a different aspect, the invention relates to a device for recognizing handwriting on a physical surface on the basis of three-dimensional signals originating from sensors, the device being noteworthy in that the signals are obtained from at least 3 different types of sensors, and in that it comprises:
an inertial sensor capable of measuring accelerations according to 3 axes,
an inertial sensor capable of measuring angular velocities according to 3 axes,
a sensor capable of measuring the value of a magnetic field according to 3 axes,
a module for sampling, over a sliding time window, the signals originating from the sensors,
a module for fusing the sampled signals into a 9-dimensional vector for each sampling period,
a module for obtaining a sequence of 9-dimensional characteristic vectors from the fused signals,
a module for detecting signals characteristic of an input start and end on the basis of the obtained sequence of characteristic vectors,
a module for storing the sequences of characteristic vectors obtained between the detection of the input start signal and the detection of the input end signal in a list of sequences of characteristic vectors, and
a module recognizing a word on the basis of the stored list of sequences of characteristic vectors, and
a module for validating a word, implemented when a word is recognized.

The invention also relates to a terminal including such a handwriting recognition device.

The invention also relates to a computer program comprising the instructions for carrying out the handwriting recognition method, when the program is executed by a processor.

The invention also relates to a computer-readable information medium on which a computer program including instructions for carrying out the steps of the handwriting recognition method is recorded.

The aforementioned different implementation methods and characteristics can be added independently or in combination with one another to the steps of the handwriting recognition method.

The servers, terminals, devices, programs and information media offer at least advantages similar to those afforded by the recognition method described above.

LIST OF FIGURES

Figure 2:
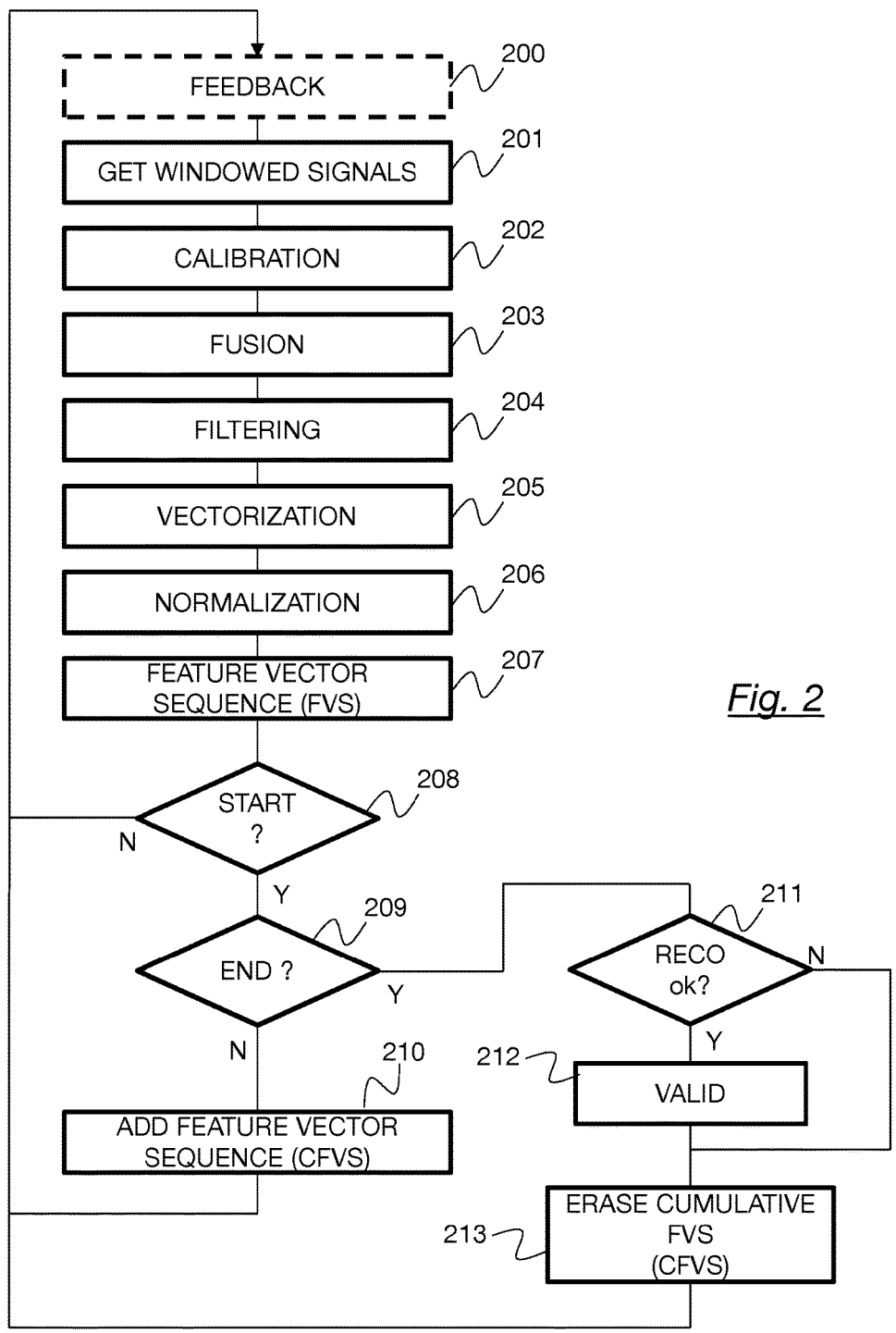
Figure 3:
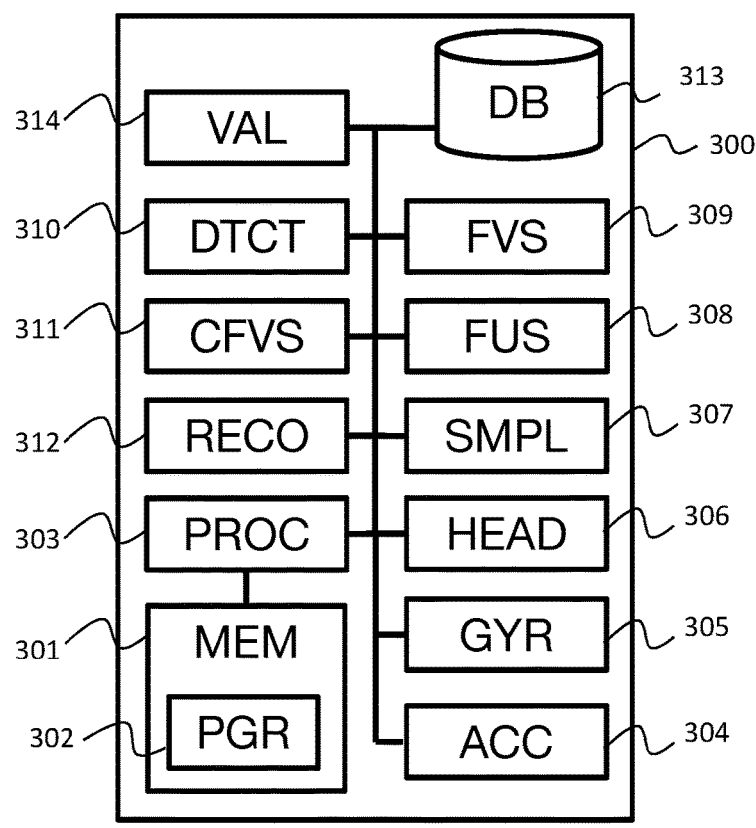

Other characteristics and advantages of the invention will become clearer from a reading of the following description of one particular embodiment, given as an illustrative and non-limiting example, and from the attached drawings, in which:

FIG. 1 shows a terminal used by a user to input text according to the invention, FIG. 2 shows in diagrammatic form the different steps for carrying out the method according to one particular embodiment of the invention, FIG. 3 shows schematically the architecture of a device capable of implementing the invention, according to one particular embodiment.

DETAILED DESCRIPTION

One particular embodiment of the invention will now be described with reference to FIGS. 1 to 3.

FIG. 1 shows a terminal 100 in the hand of a user. This terminal 100 is an intelligent terminal such as a Smartphone. This type of terminal is equipped with a processor and a memory and is capable of executing computer programs including instructions for running various applications. For example, applications can be downloaded from a server via an Internet connection and can be recorded in a non-volatile memory of the terminal, such as a flash memory, for example. The instructions of the program of an application can be loaded into a RAM memory (Random Access Memory) of the terminal in order to be executed by the processor. The terminal 100 furthermore includes sensors capable of measuring movements of the terminal. In particular, the terminal 100 comprises an accelerometer-type sensor capable of measuring the accelerations undergone by the terminal according to 3 axes, and a sensor capable of measuring angular velocities, such as, for example, a rate gyro capable of measuring rotations of the terminal according to 3 axes. The terminal also includes a magnetic field sensor, such as, for example, a magnetometer capable of measuring a magnetic field according to 3 axes. An application downloaded into a memory of the terminal may thus comprise instructions for obtaining values measured by the different sensors and for determining the changes of position and orientation of the terminal in relation to a reference position or orientation. These different sensors may be used to determine the movements and the orientation of the terminal when it is manipulated by a user.

The user holds the terminal in the manner of a pen and forms a word 101 by moving the top left-hand corner of the terminal against a support 103 such as a table. The drawn path 101 is obviously not visible on the support since the terminal 100 is not a pen. The successive positions and orientations are measured using sensors during the drawing of the word 101. The terminal 100 implements the present invention according to one particular embodiment in order to display the word 101 formed by the user on a screen 102.

FIG. 2 shows the main steps of the recognition method according to one particular embodiment of the invention.

During a first optional step 200, the terminal informs the user of its status by means of feedback (visual, audio, or tactile) in order to invite, for example, the user to start or continue an input. The terminal may, for example, emit a vibration to indicate to the user that it is ready for the input or may display a message on a screen.

In step 201, the terminal obtains information relating to the movement of the terminal from on-board inertial sensors. For example, the terminal obtains data relating to acceleration according to 3 axes from an accelerometer, data relating to angular velocity representing rotations undergone by the terminal according to 3 axes, and data originating from a magnetometer capable of determining the orientation of the terminal in relation to a magnetic field and, in particular, in relation to the earth's magnetic field. The data from the sensors are, for example, sampled at a frequency that is sufficiently high for the dataset to be representative of the drawn path, but sufficiently low for these data to be processed by a mobile terminal. A sampling frequency of 100 Hertz, for example, provides a satisfactory signal resolution, but without producing an excessive quantity of data. The signals thus captured are stored by using a sliding time window capable of storing signals produced during the writing of a word. A time window of 50 milliseconds, for example, can be used.

The captured signals are calibrated during a step 202. The values returned by the sensors are thus modified in such a way as to compensate for any bias that may adversely affect the measurements. Bias of this type can be introduced by the sensors, for example. The calibration can be implemented by correcting the measurements returned by the sensors with a deviation value in relation to a reference value. The deviation value can be calculated, for example, by means of a difference between a reference value and the values returned by the sensors when the terminal is in a predefined rest position.

The data originating from the different sensors are fused in step 203. These data are, for example, concatenated sample-by-sample. For example, if $\{acc\_x(t), acc\_y(t), acc\_z(t)\}$ are the values originating from the acceleration sensor, $\{gyro\_x(t), gyro\_y(t), gyro\_z(t)\}$ the values from the angular velocity sensor, and $\{mag\_x(t), mag\_y(t), mag\_z(t)\}$ the values of the magnetic field measured by a magnetic field sensor, the result of the fusion is a 9-dimensional vector denoted $\{acc\_x(t), acc\_y(t), acc\_z(t), gyro\_x(t), gyro\_y(t), gyro\_z(t), mag\_x(t), mag\_y(t), mag\_z(t)\}$, i.e. the method considers a 9-dimensional vector at each time period. The method differs from approaches using each dimension of the signal independently, or approaches concatenating the homogeneous values of a single sensor, by grouping data that are heterogeneous by nature, since they originate from different sensors, but are correlated since they respond to the same movement.

Conventional signal processing techniques are applied in step 204 to denoise the information and highlight the characteristics with a low-pass filter. For example, the method may use a discrete low-pass filter, having a parameter β, defined as follows:

If G is the unfiltered gesture, the filtered gesture GF is defined by:

$$GF_{t+1} = (1-\beta) \cdot G_t + \beta \cdot GF_t$$

The performance of the method is empirically optimal when β=0.78.

During step 205, the signals are approximated in such a way as to simplify the signal by line segments. For example, the approximation step can be carried out by applying an algorithm such as that presented in the article entitled "On the Approximation Of Curves By Line Segments Using Dynamic Programming-II" published in February 1962 by Richard Bellman and Bella Kotkin in "United States Air force Project Rand". Experience has shown that the method is particularly effective when the approximation algorithm is configured with a local error parameter at 0.12.

In step 206, the vectors are normalized according to a conventional technique producing values in the range [0 . . . 1] in order to compensate for the differences in the amount of the values produced by the different sensors. Steps 201 to 206 thus provide a simplified signal whose characteristics are highlighted and best describe the useful information. This preprocessing of the signals provides a characteristic vector sequence (FVS for "Feature Vector Sequence" in English) in step 207.

In step 208, the terminal checks whether an input start signal has already been detected. To do this, the terminal may consult, for example, a "STARTED" Boolean variable stored for this purpose. If the "STARTED" variable is positioned at "TRUE", the terminal directly performs step 209. If the "STARTED" variable is positioned at "FALSE", a detection is performed in step 208. The detection is performed on the basis of the FVS sequence obtained in step 207 by comparing the sequence with a knowledge base collecting examples of FVS sequences corresponding to the start of word input. This knowledge base is, for example, a database created in advance. According to one particular embodiment, the input start signal corresponds to the signal generated by the sensors following the micro-impact resulting from the contact between the terminal and the physical surface when the user prepares to form a word. FVS sequences corresponding to an input start are thus stored in a database and are used in comparison with the FVS sequence obtained in step 207 to detect the start of the input. The search for correspondence can be carried out by implementing a dynamic time warping algorithm (DTW, for Distance Time Warping in English). An algorithm of this type allows measurement of the similarity between two sequences which may vary over time, such as, for example, two FVS sequences.

If no correspondence is found with an FVS sequence indicating the input start, the previously described steps 200 to 208 are repeated in order to obtain a new FVS sequence which will again be compared with the FVS sequences of the database in order to detect an input start.

When a correspondence is detected, the terminal stores the fact that an input has started by assigning value "TRUE" to the "STARTED" Boolean variable.

In step 209, the terminal searches for a correspondence between the FVS sequence obtained in step 207 and an element from a knowledge base collecting examples of FVS sequences defining the end of input of words. This knowledge base is, for example, a database previously created with FVS sequences corresponding to the end of the input. As in step 208, the comparison between the FVS sequence obtained in step 207 and one of the elements from the database can be performed by means of a dynamic time warping algorithm (DTW, for Distance Time Warping in English). According to one particular embodiment, the input end signal corresponds to the signal generated by the sensors following a particular gesture performed by the user when he has completed the input of a word, the gesture corresponding, for example, to the end of the contact between the terminal and the physical support.

If no correspondence is found between the FVS sequence obtained in step 207 and an element from the knowledge base containing the examples of input end FVS sequences, the FVS sequence obtained in step 207 is added to a list of FVS sequences (denoted CFVS, for Cumulative Feature Vector Sequence in English) in step 210. According to one particular embodiment, the CFVS list is a list of which each element is an FVS sequence. Following the addition of the sequence to the list, and provided that no input end sequence is detected, the terminal repeats the performance of steps 200 to 210 described above.

When, in step 209, a correspondence is detected between the FVS sequence obtained in step 207 and an element from the knowledge base containing the examples of input end FVS sequences, the CFVS list contains the FVS sequences corresponding to a word input by the user. This list is then used in step 211 to perform the recognition of the input word. According to one particular embodiment, the terminal uses a BLSTM (for Bidirectional Long Short-Term Memory in English) neural network with a connectionist temporal classification. A neural network of this type is described in the document entitled "Connectionist temporal classification: Labelling unsegmented sequence data with recurrent neural networks", Alex Graves and Santiago Fernandez and Faustino Gomez, ICML 2006.

According to one particular embodiment, the network includes 150 LSTM (Long Short-Term Memory in English) neurons, a learning rate of 4.5e-4 and a momentum of 0.15. This network has been trained in advance on the basis of CFVS lists corresponding to different words from the vocabulary of the language concerned. The network is trained in a conventional manner by presenting a CFVS list at the input while imposing a corresponding word at the output. The network then recognizes a word on the basis of the list of sequences of characteristic vectors created in step 210 and, in a conventional manner, associates a confidence score with this recognition. The confidence score corresponds to a probability that the neural network has correctly recognized a word.

If the confidence score is sufficient, for example greater than 0.9, the recognized word is validated in step 212. If not, the terminal directly performs step 213.

During step 212, the recognized word is validated on the basis of a language model in order to ensure that the word exists in the vocabulary of the language concerned and is a good match with other words already recognized by the system by considering, for example, spelling, syntax or grammar. To do this, the word may, for example, be submitted to a spelling correction module. If, at the end of this step, the recognized word is considered valid, the terminal performs an appropriate feedback to the user. For example, the recognized word is displayed on the screen of the terminal or on a screen associated with the terminal.

When the confidence score obtained in step 211 is not sufficient, the validation step 212 is not performed in order to improve the overall performance of the recognition by avoiding validation of a word that is highly likely to be incorrect. Here, the invention advantageously uses the confidence score to save resources and computing time by avoiding the performance of the validation step when the word is probably incorrect.

In step 213, the CFVS list created by successive iterations of steps 200 to 210 and subjected at the input of the neural network to recognition during step 211 is reinitialized in such a way as to free up the resources necessary for the recognition of the new word. The "STARTED" variable is also positioned at "FALSE" during this step.

The terminal is then ready for a new text input. Step 200 can be performed again to inform the user of the result of the preceding recognition. For example, the terminal can emit a vibration to indicate to the user that a word has been correctly recognized, or a plurality of vibrations to indicate that a recognition error has occurred.

The invention thus allows recognition of handwriting from a terminal used as a pen. The invention is particularly advantageous since the recognition is performed directly on the basis of the signals originating from the sensors, without intermediate steps of reconstruction of the drawn path.

FIG. 3 shows a device 300 for recognizing handwriting carrying out the method according to one particular embodiment of the invention.

The device includes a storage space 301, for example a memory MEM, a processing unit 303 equipped, for example, with a processor PROC. The processing unit can be controlled by a program 302, for example a computer program PGR, carrying out the handwriting recognition method as described in the invention with reference to FIG. 2, and, in particular, the steps of sampling, according to 3 axes and over a sliding time window, of inertial signals originating from at least 3 different sensors, fusing the sampled signals into a 9-dimensional vector for each sampling period, converting the fused signals into a 9-dimensional FVS sequence, and, when a signal characteristic of an input start has been detected, storing the FVS sequence in a CFVS list, detecting a signal characteristic of an input end, detecting a signal characteristic of an input end and recognizing a word on the basis of the CFVS list drawn up over the time window.

On initialization, the instructions of the computer program 302 are, for example, loaded into a RAM memory (Random Access Memory in English) before being executed by the processor of the processing unit 303. The processor of the processing unit 303 performs the steps of the recognition method according to the instructions of the computer program 302.

To do this, the device includes, as well as the memory 301, an inertial sensor 304 capable of measuring accelerations according to 3 axes, such as, for example, an accelerometer ACC, an inertial sensor 305 capable of measuring angular velocities according to 3 axes, such as, for example, a rate gyro GYR, and a sensor 306 capable of measuring the value of a magnetic field according to 3 axes, such as, for example, a magnetometer HEAD.

The device furthermore includes a sampling module 307 (SMPL) capable of sampling signals originating from the sensors over a sliding time window. The sampling module may, for example, use a circular buffer memory with sufficient capacity to store samples over a period corresponding to the time window, and a clock capable of periodically instigating the reading of the outputs of the sensors and the storage of these values in the circular buffer memory.

According to one particular embodiment, the device also includes a module 308 (FUS) for fusing the sampled signals into a 9-dimensional vector for each sampling period. The fusion module is capable of synchronizing the samples corresponding to the same time and concatenating them into a 9-dimensional vector representing, for a given time, measurements according to 3 dimensions performed by the 3 sensors.

The device also includes a module 309 for obtaining a 9-dimensional FVS sequence on the basis of the fused signals, wherein, according to one particular embodiment, the module is capable of approximating the samples and normalizing them in order to create an FVS sequence.

The device furthermore includes a module 310 (DTCT) for detecting signals characteristic of an input start and end on the basis of the obtained FVS sequence by comparing an FVS sequence with FVS sequences contained in a database, such as, for example, in the database 313 included in the terminal.

According to one particular embodiment, the database 313 is outside the terminal and is located, for example, on a server of a network. The device then comprises a communication module capable of sending requests to the server hosting the database 313 and of receiving responses to these requests. The communication module may, for example, be an Ethernet network card or a Wi-Fi or 3G wireless interface.

The device also includes a module 311 (CFVS) for storing the FVS sequences obtained between the detection of the input start signal and the detection of the input end signal in a CFVS list, a module for recognizing a word on the basis of the stored CFVS list and a module 314 (VAL) for validating a word, implemented when a word is recognized.

According to one particular embodiment, the device may be integrated into a portable terminal such as a Smartphone or tablet, a watch, a wristband, a pen, or any other portable device provided with suitable sensors.

The invention claimed is:

1. A method for recognizing handwriting on a physical surface on the basis of three-dimensional signals originating from sensors of a terminal, the method being characterized in that the signals are obtained on the basis of at least 3 different types of sensors, and in that it comprises the following steps:

sampling, according to 3 axes and over a sliding time window, of inertial signals originating from the sensors, fusing the sampled signals into a 9-dimensional vector for each sampling period, converting the fused signals into a sequence of characteristic 9-dimensional vectors, and, when a signal characteristic of an input start has been detected:

storing the sequence of characteristic vectors in a list of sequences of characteristic vectors, the preceding steps being repeated until the detection of a signal characteristic of an input end, the method furthermore comprising, on detection of said signal characteristic of an input end, a step of:

recognizing a word on the basis of the list of sequences of characteristic vectors created between the detection of the input start and end signals;

wherein the signals characteristic of an input start and end are identified by means of a comparison between a sequence of characteristic vectors and at least one previously recorded sequence of characteristic vectors, and wherein the signal characteristic of an input start is an inertial signal characteristic of a micro-impact on a physical surface.

2. The method as claimed in claim 1, characterized in that it furthermore includes a step of validation of the recognized word by a linguistic model.

3. The method as claimed in claim 1, characterized in that the step of recognizing a word is performed by a recurrent bidirectional neural network.

4. The method as claimed in claim 3, characterized in that the neural network is trained in advance on the basis of sequences of characteristic vectors corresponding to words from the vocabulary of the language concerned.

5. The method as claimed in claim 1, characterized in that the step of converting the signals into a sequence of characteristic vectors includes steps of:

calibrating the signals originating from the sensors, denoising the calibrated signal by applying a low-pass filter, and approximating and normalizing the filtered signals.

6. A device for recognizing handwriting on a physical surface on the basis of three-dimensional signals originating from sensors, the device being characterized in that the signals are obtained from at least 3 different types of sensors of the device, and in that it comprises:

a module for sampling, over a sliding time window, the signals originating from the sensors, a module for fusing the sampled signals into a 9-dimensional vector for each sampling period, a module for converting the fused signals into a sequence of 9-dimensional characteristic vectors, a module for detecting signals characteristic of an input start on the basis of the converted sequence of characteristic vectors, a module for storing the sequences of characteristic vectors obtained between the detection of the input start signal and the detection of the input end signal in a list of sequences of characteristic vectors when a signal characteristic of an input start has been detected, the signals characteristic of an input start and end being identified by means of a comparison between a sequence of characteristic vectors and at least one previously recorded sequence of characteristic vectors, the signal characteristic of an input start being an inertial signal characteristic of a micro-impact on a physical surface, and a module for recognizing a word on the basis of the stored list of sequences of characteristic vectors when a signal characteristic of an input end has been detected, and a module for validating a word, implemented when a word is recognized.

7. A terminal, characterized in that it comprises a device for recognizing handwriting on a physical surface on the basis of three-dimensional signals originating from sensors, the device being characterized in that the signals are obtained from at least 3 different types of sensors of the device, and in that it comprises:

a module for sampling, over a sliding time window, the signals originating from the sensors, a module for fusing the sampled signals into a 9-dimensional vector for each sampling period, a module for converting the fused signals into a sequence of 9-dimensional characteristic vectors, a module for detecting signals characteristic of an input start and end on the basis of the converted sequence of characteristic vectors, a module for storing the sequences of characteristic vectors obtained between the detection of the input start signal and the detection of the input end signal in a list of sequences of characteristic vectors when a signal characteristic of an input start has been detected by the detection module, the signals characteristic of an input start and end being identified by means of a comparison between a sequence of characteristic vectors and at least one previously recorded sequence of characteristic vectors, the signal characteristic of an input start being an inertial signal characteristic of a micro-impact on a physical surface, and a module for recognizing a word on the basis of the stored list of sequences of characteristic vectors when a signal characteristic of an input end has been detected by the detection module, and a module for validating a word, implemented when a word is recognized.

8. A non-transitory computer-readable information medium on which a computer program is recorded, including instructions for carrying out steps of a handwriting recognition method for recognizing handwriting on a physical surface on the basis of three-dimensional signals originating from sensors of a terminal, the method being characterized in that the signals are obtained on the basis of at least 3 different types of sensors, and in that it comprises the following steps:

sampling, according to 3 axes and over a sliding time window, of inertial signals originating from the sensors, fusing the sampled signals into a 9-dimensional vector for each sampling period, converting the fused signals into a sequence of characteristic 9-dimensional vectors, and, when a signal characteristic of an input start has been detected:

storing the sequence of characteristic vectors in a list of sequences of characteristic vectors, the preceding steps being repeated until the detection of a signal characteristic of an input end, the method furthermore comprising, on detection of said signal characteristic of an input end, a step of:

recognizing a word on the basis of the list of sequences of characteristic vectors created between the detection of the input start and end signals; wherein the signals characteristic of an input start and end are identified by means of a comparison between a sequence of characteristic vectors and at least one previously recorded sequence of characteristic vectors, and wherein the signal characteristic of an input start is an inertial signal characteristic of a micro-impact on a physical surface.

* * * * *